US006934388B1

(12) United States Patent
Clark

(10) Patent No.: US 6,934,388 B1
(45) Date of Patent: Aug. 23, 2005

(54) METHOD AND APPARATUS FOR GENERATING RANDOM PERMUTATIONS

(75) Inventor: James Monroe Clark, Verona, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 814 days.

(21) Appl. No.: 09/711,169

(22) Filed: Nov. 13, 2000

Related U.S. Application Data

(60) Provisional application No. 60/164,943, filed on Nov. 12, 1999.

(51) Int. Cl.[7] ............................. H04L 9/00; H04K 1/00; H04K 1/04; H04K 1/06; G06F 1/02
(52) U.S. Cl. ............................. 380/47; 380/42; 380/28; 380/37; 708/250
(58) Field of Search ............................. 380/47, 46, 42, 380/28, 37; 372/132; 708/250; 375/132; 370/344

(56) References Cited

U.S. PATENT DOCUMENTS

| | | | | |
|---|---|---|---|---|
| 4,476,566 A | * | 10/1984 | Dent | 375/132 |
| 4,876,659 A | * | 10/1989 | Devereux et al. | 708/250 |
| 4,979,832 A | * | 12/1990 | Ritter | 380/28 |
| 5,287,384 A | * | 2/1994 | Avery et al. | 375/134 |
| 5,297,207 A | * | 3/1994 | Degele | 380/46 |
| 5,623,549 A | * | 4/1997 | Ritter | 380/37 |
| 5,727,062 A | * | 3/1998 | Ritter | 380/37 |
| 5,734,721 A | | 3/1998 | Clark | |
| 6,049,561 A | * | 4/2000 | Pezzlo et al. | 375/132 |
| 6,400,824 B1 | * | 6/2002 | Mansoorian et al. | 380/269 |

OTHER PUBLICATIONS

Akl, Selim G. et al. "A Fast Pseudo-Random Permutation Generator With Applications to Cryptology", Crypto '84, 1984.*

Gyorfi, Laszlo et al. "Analysis of protocol sequences for slow frequency hopping", 1998.*

Brown, Lawrence et al. "On The Design of Permutation P In DES Type Cryptosystems", Eurocrypt '89, 1989.*

Ecker, A. "Time-Division Multiplexing Scramblers: Selecting Permutations And Testing The System", Eurocrypt '84, 1984.*

Jansen, Cees J.A. "On the Construction of Run Permuted Sequences", Eurocrypt '90, 1990.*

Microsoft. "Microsoft Computer Dictionary, Fifth Edition", p. 445.*

Ritter, Terry. "Transposition Cipher with Pseudo-Random Shuffling: The Dynamic Transposition Combiner", 1991 Cryptologia.*

* cited by examiner

Primary Examiner—Gregory Morse
Assistant Examiner—Michael J. Simitoski
(74) Attorney, Agent, or Firm—Edell, Shaprio & Finnan, LLC

(57) ABSTRACT

An apparatus (10) for generating a sequence of blocks of randomly permuted multi-bit data elements includes an input register (12) that produces a repeating block of distinct input data elements from which output blocks of permuted data elements are generated. A permutation logic unit (14) forms an output data element from each input data element in accordance with random data stored in random code memories (16). The output data element produced by the permutation logic unit is supplied to an output register (18). The manner in which the random data is selected and applied by the permutation logic unit ensures that each of the data elements in the input block will be mapped into an output position in the output block.

38 Claims, 5 Drawing Sheets

METHOD AND APPARATUS FOR GENERATING RANDOM PERMUTATIONS

CROSS REFERENCE TO RELATED APPLICATION

This application claims priority from U.S. Provisional Patent Application Ser. No. 60/164,943 entitled "Hop Sequence Generator," filed Nov. 12, 1999. The disclosure of this provisional patent application is incorporated herein by reference in its entirety.

BACKGROUND OF THE INVENTION

1. Field of the Invention

The present invention relates to a method and apparatus for generating random permutations and, more particularly, to a technique for producing a random sequence of data elements by permuting an input sequence of blocks of data elements.

2. Description of the Related Art

Numerous techniques exist to generate deterministic random sequences. Random sequences generated from such techniques are useful in a variety of applications, including the formation of hop code sequences in frequency-hopping schemes used in certain communication systems. In frequency-hopping systems, the total available transmission bandwidth is partitioned into a number of sub-bands, and the frequency of the transmitted carrier signal is periodically changed or "hopped" from one sub-band to another. Hopping among frequencies in accordance with a random or pseudo-random sequence substantially avoids interference with other signals transmitted within the same band and makes detection and jamming of transmitted signals difficult for parties other than the intended recipient.

With most conventional frequency-hopping schemes, a random sequence is desired and produced. In a random sequence, the random values produced are equally probable, such that selection of any one of the random values is equally probable for each successive output in the sequence. Thus, with a random sequence, the next frequency hop in the sequence is equally likely to be any one of the frequencies within the transmission bandwidth. However, if each of N random values (or transmission frequencies) is equally probable for each output (hop) in the sequence, one would not expect that, of N successive outputs (hops) in a sequence, each of the N values (frequencies) will occur exactly once.

A random sequence is to be distinguished from a random permutation. With a random permutation, a sequence is produced from a set of values arranged in a random order such that a sequence of N successive outputs includes exactly one occurrence of each of the N values in the set.

The difference between a random sequence and a random permutation can be illustrated with examples involving probabilistic trials. A random sequence can be generated by repeatedly throwing a die and obtaining one of the six possible values (1, 2, 3, 4, 5 and 6). With each trial, there is an equal likelihood of obtaining each of the six possible values. However, if one throws a die six times (or, equivalently, six dice simultaneously), one does not expect each of the possible values to occur exactly once in some random order. By contrast, a random permutation can be produced by placing six numbered tokens in a box and blindly selecting one token at a time until all six token have been selected (or, equivalently, shaking and spilling the tokens and reading their values in order, relative to some predetermined orientation, such as left to right). In the token example, a sequence of six values is produced, where each values occurs exactly once within the sequence.

It may be desirable in certain frequency-hopping schemes to determine the sequence of frequency hops using a random permutation rather than a random sequence. For example, in certain signal transmission and detection schemes, it may be advantageous for each frequency to be used within a given block of time or for the period between reuse of frequencies to be maintained within a predetermined range. Use of a random permutation ensures that, over a relatively short period of time, all of the available frequencies will be used, thereby enhancing the uniformity of frequency use.

Moreover, sequences formed from random permutations may be useful in a variety of other applications. For example, random permutations are used in the encryption technique disclosed in U.S. Pat. No. 5,734,721 to Clark, the disclosure of which is incorporated herein by reference in its entirety. Random permutations are used in the Clark patent to permute blocks of bits. Random permutations also potentially have application in virtually any signal encoding scheme where it is desired to adjust the random encoding in a controlled manner over time, as will become evident.

While effective for permuting bits, the permutation methodology disclosed in the Clark patent requires significant hardware and can become inefficient for certain applications. For example, a permutation useful in a frequency-hopping scheme requires more than simply permuting positions of individual bits. If each available frequency is assigned a number in a sequence, a random hop code sequence of these frequencies can be produced by generating a random permutation of the corresponding numbers. This requires permuting N-bit numbers that represent positions in a sequence rather than permuting individual bits. To illustrate this difference, consider that when binary bits that represent a number are permuted (e.g., the four-bit number 0001), the result is a four bit number formed from these same bit values: 0001, 0010, 0100 or 1000 (respectively representing decimal numbers 1, 2, 4 or 8). In the case of four-bit numbers that represent sixteen transmission frequencies in a frequency-hopping system, the desired process randomly permutes all of the four-bit numbers (0, 1, 2, 3, 4, . . . 14, 15) to obtain, for example: (11, 2, 7, 14, 3, 0, 9, 1, 13, . . . ). Thus, forming a sequence of randomly permuted frequencies requires the capability to permute a block of multi-bit data elements that represent numbers or pieces of information, and not merely the capability to permute individual symbols or bits. A substantial number of random bits and considerable processing would be required to accomplish the task of permuting transmission frequencies in a frequency-hopping scheme using the permutation methodology disclosed in the Clark patent.

Other known techniques for generating random permutations are also relatively inefficient from a hardware or processing standpoint. Furthermore, it would be desirable to have the capability to control the rate at which the permutation is modified, particularly in the frequency-hopping context or other signal encoding schemes.

Accordingly, there remains a need for an efficient and inexpensive implementation of a random permutation methodology that is useful in information transmission schemes that employ frequency-hopping and any other applications requiring a sequence of randomly permuted values.

SUMMARY OF THE INVENTION

Therefore, in light of the above, and for other reasons that become apparent when the invention is fully described, an object of the present invention is to generate sequences of randomly permuted data elements, and, more particularly, to produce a random output sequence of numbers by permuting blocks of data elements in an input sequence.

A further object of the present invention is to form a sequence of hop codes corresponding to transmission frequencies in a communication system employing frequency-hopping.

Yet a further object of the present invention is to randomly permute a block of data elements, wherein each of the data elements is represented by plural bits whose values identify the data element.

A still further object of the present invention is to provide the capability to control the rate at which a randomly permuted output sequence, generated from a repeating input block of data elements, is modified.

Another object of the present invention is to minimize the hardware and processing required to generate a randomly permuted sequence of data elements.

Yet another object of the present invention is to randomly permute a block of data elements, wherein the block includes any integer number of data elements.

Still another object of the present invention is to maintain substantial uniformity among permuted blocks of data elements, such that a data element in a given position within an input block is equally likely to be mapped to any of the positions in a permuted output block, and a data element in a given position in the output block is equally likely to have originated from any position in the input block.

The aforesaid objects are achieved individually and in combination, and it is not intended that the present invention be construed as requiring two or more of the objects to be combined unless expressly required by the claims attached hereto.

In accordance with the present invention, random data is used to generate a random permutation of a block of multi-bit data elements. An input register, such as a counter, generates a multi-bit data element (e.g., an N-bit number) upon being clocked by a periodic clock pulse. A sequence of clock pulses generates a set or "block" of data element in which each data element occurs exactly once (e.g., a four-bit binary counter that generates sixteen numbers, zero to fifteen). As each data element is generated, it is supplied to a permutation logic unit which operates on the bits of the data element to produce an output data element. Specifically, random data is used to decide whether each bit of the output data element will have the same or opposite value of the corresponding bit of the input data element. The random data is selected from random code memories addressed using bits of the input and output data element in such a manner that each data element is mapped from a position in the input block to a position in the output block, with each data element occurring exactly once the output block, thereby making the output block a random permutation of the input block.

The present invention accomplishes the permutation of a block of multi-bit (i.e.; more than one bit) data elements using far fewer random bits than would be required with conventional techniques, thereby reducing hardware and processing requirements. Nevertheless, the technique of the present invention provides acceptable uniformity in the sense that the data element in each position in the input block is equally likely to be mapped into any position in the output block, and each position in the output block is occupied by a data element that has an equal probability of having originated from any position in the input block.

In many applications, the input is actually a sequence of blocks of data elements. The rate at which the block permutations vary in the output sequence can be controlled by how often the random data is changed. If the random data is changed after every block, each successive output block will have an independent permutation. Changing of each bit in the random data will effect a corresponding change (swap) of positions of two data elements in the output block. By changing a subset of the random bits at a time, permutations of successive blocks will be more similar (not independent), and the permutation can be changed gradually over time.

In accordance with one embodiment of the present invention, a block of $2^N$ data elements can be truncated to a set of data elements other than exactly $2^N$ by generating a permutation of $2^N$ data elements and then remapping data elements into specific output positions as necessary to include only the desired data elements in the resulting output block.

The block permutation technique of the present invention can be used in a frequency-hopping communication system to generate sequences of hop codes that controls the transmission frequency of the system. The present invention is also useful in "code replacement" schemes as described herein.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

Figure 1:
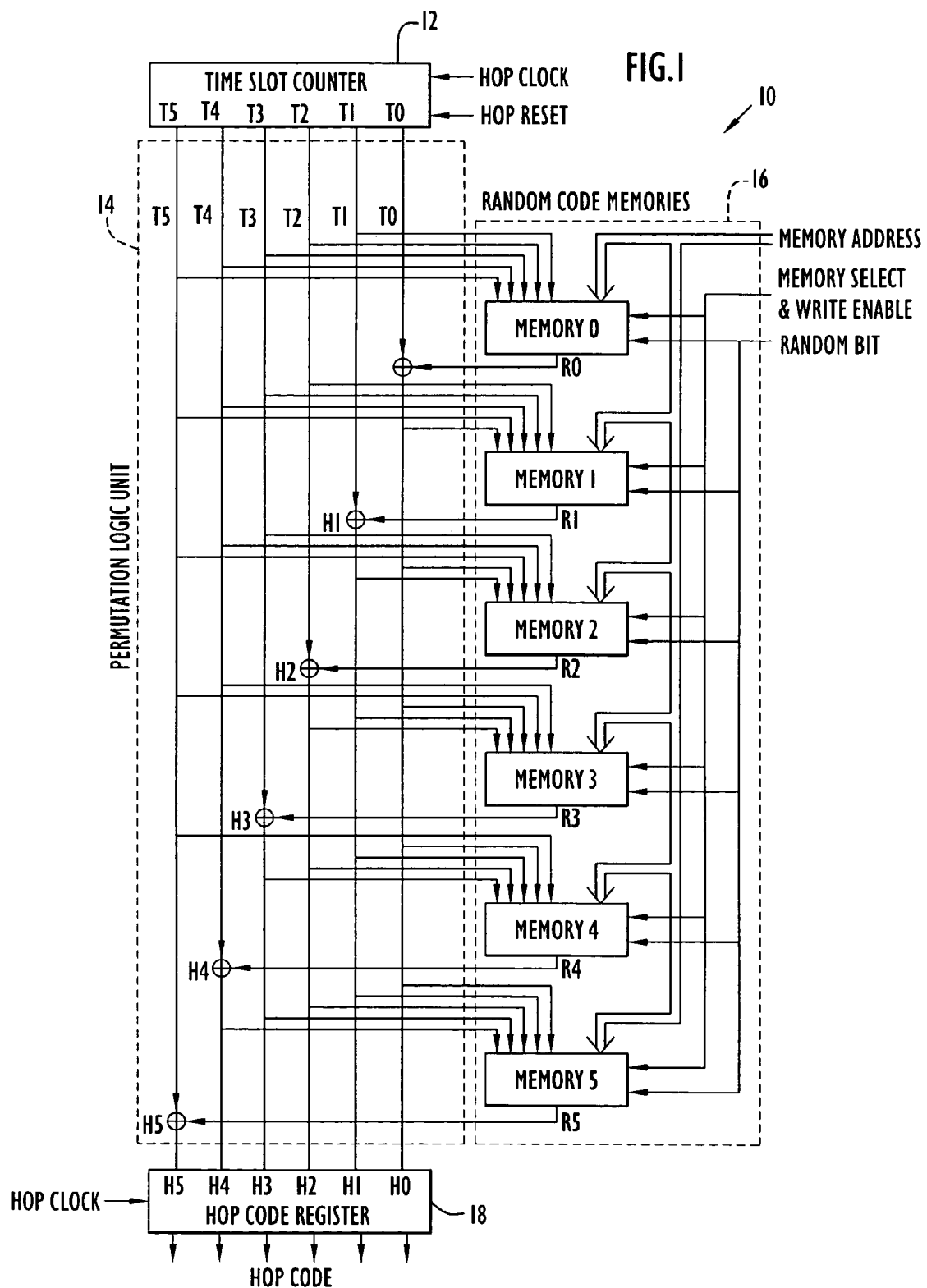
FIG. 1 is a schematic diagram illustrating a hop sequence generator for generating a sequence of randomly permuted data elements in accordance with an exemplary embodiment of the present invention.

The following detailed explanations of FIGS. 1–5 and of the preferred embodiments reveal the methods and apparatus of the present invention. In accordance with the present invention, an input sequence of data elements is randomly permuted to produce an output sequence of data elements. As used herein, the term data element refers to an item, object, number, character or other piece of information that is represented by symbols, such as a plurality of binary bits. The input sequence of data elements comprises blocks of several such data elements in a particular order, with each data element occurring once within each block. The input sequence may include any number of successive blocks of data elements. For example, the input sequence can be a repeating count of sixteen decimal numbers beginning with zero and increasing incrementally to fifteen. Each of the numbers in the block of sixteen numbers is distinct from the other numbers in the block, with each number being represented by a different set of four binary bits (e.g., 0000, 0001, 0010, . . . , 1111) which occur only once in the block. After the last data element in the input block is generated, the input block is repeated, beginning again with the first data element in the block.

The bits of each data element in an input block of an input sequence are supplied to a permutation logic unit which operates on each bit of the data element to produce an output data element that is one of the data elements in the input block. Stated differently, the permutation logic maps the position of each data element in the input block to a position in a corresponding output block of the output sequence. Specifically, using random data, an operation is performed on each bit of the input data element to determine whether or not the corresponding bit of the output data element will have the same or different value. The manner in which the random data is selected and applied ensures that an input block of $2^N$ distinct data elements, where each data element has N bits, will yield an output block of these same $2^N$ data elements in a permuted order (i.e., a random permutation of the input block).

As used herein the term "block" refers to a set or sequence of data elements in some order. In the embodiment described herein, the data elements are generated one at a time and the ordering of data elements in the block is based upon the time sequence. In general, however, the data elements need not be generated one at a time in sequence (e.g., the data elements may all be stored in a memory), and the ordering of the data elements within the block can be based on any desired criterion. As used herein, the term "position" refers to the assigned location of a data element within the ordered set or sequence of data elements in a block. The term position can refer to: a place, such as a position in a data memory; a time, such as in a time sequence of elements; or a value, as in an ordered range of discrete frequencies.

The aforementioned Clark patent implements two kinds of permutations: a block-type permutation and a stream-type permutation. The block-type permutation described in the Clark patent can be described as an "explicit" block permutation and is used therein to rearrange the order of a set of binary bits. In effect, the positions of the ones and zeros in a block of binary bits are altered by performing a series of random position swaps between pairs of bits. The result is a list of binary bits having the same number of ones and zeros as the original list of binary bits, but in a different order. For example, to permute a block of eight bits, a three-stage swap process is performed. In the first stage, four random bits are respectively used to determine whether to swap bit 0 with bit 1, bit 2 with bit 3, bit 4 with bit 5, and bit 6 with bit 7. In each case, the swap is performed if the random bit is a "one" and not performed if the random bit is a "zero." Once the first stage is completed, conditional swaps (0=no swap, 1=swap) are performed in a second stage between bits 0 and 2, 1 and 3, 4 and 6, and 5 and 7, respectively using four additional random bits. Finally, a third stage of conditional swaps between bits 0 and 4, 1 and 5, 2 and 6, and 3 and 7 is performed using four additional random bits. The inverse permutation can be performed by applying the three swap stages in reverse order to the output block to yield the original (un-permuted) input block.

This type of block permutation applies only to blocks of $2^N$ items (bits, symbols, frequency codes, etc.). One way to described this type of permutation is that it can be implemented by randomly swapping pairs of items, where the swaps are arranged in the same pattern as the "butterflies" of a Fast Fourier Transform (FFT), and where the swaps are unbiased and independent choices. The random bits can be arranged as $2^{N-1}$ N-bit integers. Of course, permutations of this type can be implemented using other techniques as well.

Using explicit block permutation, the output positions of each input bit will be equally probable if the random bits are uniform and independent (i.e., the bit in any given input position in the input block has an equal likelihood of ending up in any of the output positions in the output block). Likewise, the bit in each output position has an equal probability of having come from any of the original input bit positions. While every possible permutation is realizable and equally probable with explicit block permutation, $N \cdot 2^{N-1}$ random bits are required to permute $2^N$ data bits, making this approach prohibitive for many applications.

Like the block-type permutation described in the Clark patent, the permutation methodology of the present invention involves a block-type permutation. However, the present invention performs block permutations in a completely different manner.

To fully appreciate the fundament differences between the explicit block permutation described in Clark patent and the implicit block permutation of the present invention, a brief overview of block permutations is warranted. A common method of doing a block permutation (usually called "interleaving") in many systems for encoding for error correction is to arrange a data buffer as a matrix, put symbols into the buffer by rows, and take the symbols out by columns. One can also shuffle a deck of cards by placing them on the table in a certain pattern and picking up the cards in another specific pattern. Both are examples of doing a permutation; that is, actually moving the objects in question.

Mathematicians have a number of ways of describing permutations, but one preferred way is a list of N integers to describe a permutation of N items (the integers range from zero to N–1). The notation is interpreted as follows: if the nth integer in the list is m, this means that the nth item (the one that was originally in position n) is moved to position m. Regardless of how two permutations are done, the two permutations will be equivalent if the descriptions are the same. If given such a description of permutation P, permutation P can be performed simply by moving the items as specified by the list.

The inverse of a permutation P is a permutation that by operating on the result of permutation P (the permuted items), will put all of the items back into the original sequence. The list of integers that describes permutation P will describe the inverse of P if the following alternative interpretation is used: if the nth integer in the list is m, this means that the item moved to position n was in position m, or that the item to be moved to position n should be taken from position m.

One way to generate a permutation P is to first produce the list of integers that describes permutation P, then move the items as specified by the list (using the first interpretation). Another way to generate a permutation P is to first produce the list of integers that describes the inverse of permutation P, then move the items according to the alternate interpretation of the list.

In accordance with another method of generating a permutation, suppose that instead of producing the entire list at one time, one defines a functional "box" that generates the value m of the nth integer in the list when given the request n as an input. An important principle of the present invention involves determining how to implement such a box for the same kind of block permutation described in the Clark patent. This box produces one piece of the definition (description) of the permutation at a time. For large permutations, this approach eliminates a large amount of memory. For this type of random permutation, the permutation depends on (is controlled by) a set of random bits. Accordingly, these bits are inputs to the box and/or are stored in the box. In the case that the permutation is applied to a transmitted time sequence, the transmitter will generally have a time counter that specifies the output sequence of the permutation. It is most convenient that the time counter provides the input n to the box, which can respond by generating the input position m. In other words, the box produces (one piece at a time) the definition of the inverse permutation.

In the case of permuting data symbols, the box controls a multiplexer (selector) that selects the symbol to be transmitted. (If the symbols are in memory, the box provides a memory address.) In a frequency-hopping application, the box produces an integer that is proportional to the desired frequency, and controls an NCO (numerically controlled oscillator) or frequency synthesizer, which produces the desired frequency.

More specifically, the present invention employs an "implicit" block permutation to produce a random permutation of a block of multi-bit data elements, not merely a permutation of a block of individual bits. Again considering the example of an input block that is a count sequence of sixteen decimal numbers from zero to fifteen, the data elements each can be represented by a unique four-digit binary number (e.g., 0000, 0001, 0010, 0011, . . . , 1111). The desired output sequence includes each of the decimal numbers in the input sequence but in a different order (e.g., 11, 2, 7, 14, 3, 0, 9, 1, 13, . . . ). The binary representation of this particular output sequence is: 1011, 0010, 0111, 1110, 0011, 0000, 1001, 0001, 1101, . . . Notably, this result is not a reordering of bits within the data elements of the input block; rather it is a reordering of the sets of bits that represent specific data elements. Thus, for example, the set of bits that represents the decimal number three (i.e., 0011), which is in the fourth position in the input block, is preserved as a bit set and appears as in the fifth position in the output block. In general, each set of binary bits representing a data element in the input block exists as a set of bits at some position in the output block.

The implicit block permutation of the present invention can be expressed as a function m=f(n) that maps each input position n to an output position m. This function can be defined as a manipulation of the position numbers expressed in binary notation. For example, for a block length of eight bits, suppose that the bit position is expressed as a three-bit binary number abc (c being the least-significant bit). The random permutation function can be expressed as the concatenation of three functions (one for each layer of swaps): f(n)=f2(f1(f0(n))). Function f0( ) reverses the value of bit c of the position number depending on the value of a random bit selected by the two-bit binary number ab extracted from the position number. Function f1( ) reverses the value of bit b of the position number depending on the value of a random bit selected by the two-bit binary number ac extracted from the position number. Function f2( ) reverses the value of bit a of the position number depending on the value of a random bit selected by the two-bit binary number bc extracted from the position number. Each component function can be implemented by an exclusive-OR gate and a memory to access the random bits. The inverse permutation can be expressed in a similar way.

This form of expressing random block permutation is needed when the permutation is used to permute entities more abstract than data symbols or bits. For example, frequency-hopping can be implemented by the random function f=r(t), where t is a time-slot counter from a counter and f is a frequency index used to control a frequency synthesizer. The frequencies are chosen randomly and uniformly except for the constraint that each frequency occurs exactly once in each block.

To better illustrate operation of the present invention, an exemplary embodiment is described in connection with FIGS. 1 and 2. A circuit 10 for generating blocks of data elements that are random permutations of a sequence of input blocks of data elements is shown in FIG. 1. Circuit 10 can be employed in a frequency-hopping communication system as a hop sequence generator that produces a frequency hop code in the form of sequence of numbers that are assigned to transmission frequencies. Accordingly, the exemplary embodiments of the present invention will be described herein in the context of a frequency-hopping communication system. However, it will be understood that the circuit and methodology of the present invention can be used in virtually any system or context to generate a sequence of data elements or numbers that is a random permutation of an input sequence of data elements or numbers. Moreover, while shown in FIG. 1 as being implemented primarily in hardware, it will be understood that the technique of the present invention can be implemented in hardware, software or any combination thereof, and the invention is not limited to the particular implementation described herein.

Hop sequence generator circuit 10 includes a time slot counter 12, a permutation logic unit 14, a set of random code memories 16, and a hop code register 18. Circuit 10 produces a hop code at the output of hop code register 18. The hop code is an N-bit unsigned integer that corresponds to a particular hop frequency used in the communication system. The value of the hop code and corresponding hop frequency depend at a given time on the state of time slot counter 12 and the contents of random code memories. In the example shown in FIG. 1, the hop code consists of six bits: $H_0$, $H_1$, $H_2$, $H_3$, $H_4$, $H_5$, $H_6$; accordingly, a sequence of sixty-four (26) distinct hop codes corresponding to sixty-four different frequencies can be generated by circuit 10. It will be understood that, in general, the number of bits N in the hop code can be any practical number of bits suitable for a particular application. While the value of six is used for N in the embodiment described herein for illustrative purposes, the invention is in no way limited to this specific value.

Time slot counter 12 serves as an input register that supplies a sequence of numbers to the permutation logic unit 18 in the form of binary digits. In the exemplary embodiment shown in FIG. 1, time slot counter is a six-bit binary counter that increments upward (1, 2, 3, . . . ) upon receiving successive clock pulses and can be reset to a count of zero. Specifically, time slot counter 12 has a clock input that receives a hop code signal and a reset input that receives a hop reset signal. A true (logic one) value of the hop reset signal enables resetting of time slot counter 12 to a count of zero. The rising edge of the hop clock is used to increment time slot counter 12 when the hop reset signal is false (logic zero). The rising edge of the hop clock is used to reset time slot counter 12 to a count of zero when the hop reset signal is true (logic 1). The falling edge of the hop clock is used to load the hop code generated by the permutation logic unit into hop code register 18.

At the rising edge of each hop clock, time slot counter 12 produces a six-bit binary "time count" number ($T_0$, $T_1$, $T_2$, $T_3$, $T_4$, $T_5$) whose decimal value is one greater than the time count produced by the previous hop clock pulse ($T_0$ is the least-significant bit). Once the time count reaches a maximum value (i.e., all six bits of time slot counter 12 have a value of one), the next hop clock pulse resets the time count to zero (i.e., all six bits have a value of zero). Thus, time slot counter 12 produces an input sequence that repeatedly counts incrementally from zero to sixty-three. The six-bit time count is supplied to permutation logic unit 14. In the example shown in FIG. 1, the block of data elements to be permuted consists of sixty-four six-bit binary numbers beginning with 000000 and incrementing up to 111111.

Random code memories 16 include N memories corresponding to the N bits of the time count (in this example, six memories). The purpose of these random code memories is to supply random bits to permutation logic unit 14 for use in operating on the input time count to produce the output hop code. Each of the N random code memories contains $2^{N-1}$ random data bits (in this example, thirty-two random bits) that are addressable by permutation logic unit 14 using an (N–1)-bit address. As used herein, the term "random" refers to a sequence, process or data having random-like properties. In most practical applications, the random process or sequence of data must be deterministic in that the same set of inputs or conditions will repeatedly produce the same "random" result every time. Thus, when randomly encoding transmission signals in a deterministic manner, the encoding is predictable to an intended recipient capable of reproducing the random encoding, but is unpredictable to unintended third parties, making it difficult or impractical for the third party to anticipate or decipher the random encoding.

In the exemplary embodiment shown in FIG. 1, each random code memory is a dual-port memory with two independent access connections and logic. The permutation logic unit 14 accesses each random code memory using an (N–1)-bit address for purposes of reading a random bit. Each random code memory is separately accessible using an (N–1)-bit memory address for reading random bits into the random code memory. In some applications, switched-port memories (one access logic switched between two sets of connections) may suffice. Another option is to provide random code memories with $2^N$ bits, wherein permutation logic unit 14 accesses one-half of the memory while random data is being read into the other half of the memory, with reading and writing being periodically switched between the two halves. Optionally, code replacement logic (not shown) may be used to adapt the memory controls to an external random data source. Although shown as N separate memory devices, it will be understood that the random code memories can be implemented with virtually any suitable memory device, including a single memory device with separately addressable portions.

Figure 2:
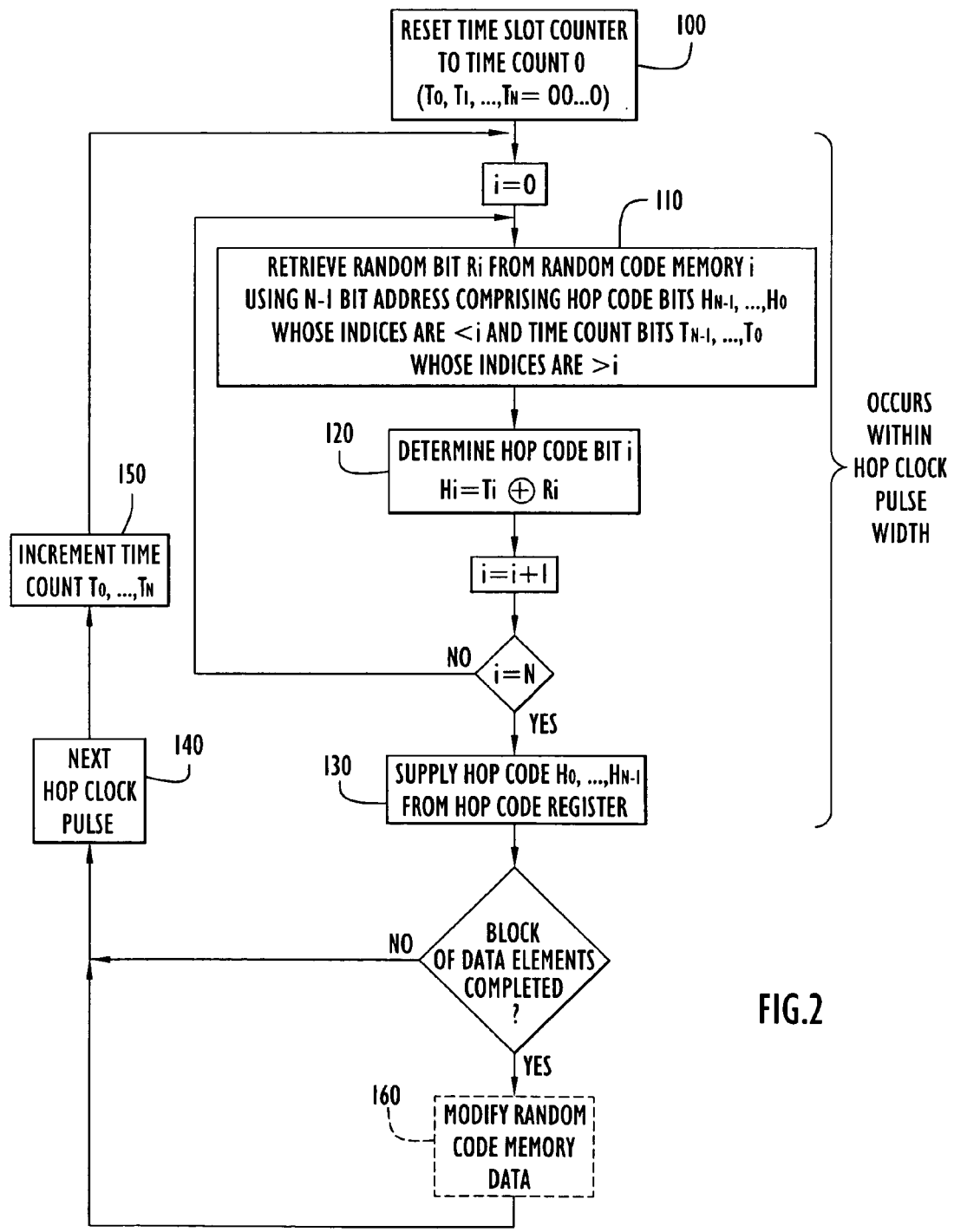
FIG. 2 is a functional flow diagram illustrating operation of the hop sequence generator shown in FIG. 1.

FIG. 2 conceptually illustrates the operation of permutation logic unit 14. Operation of permutation logic unit 14 can be described as a sequence of "steps" involving modification or conversion of individual bits of each input time count. However, it should be understood that these steps are not a sequence of clocked operations but rather a sequence of logic layers with a "ripple" delay. The ripple delay begins with the clocking of time slot counter 12 at the rising edge of a hop clock pulse and ends before hop code register 18 is clocked at the falling edge of the same hop clock pulse. For ease of explanation, the sequence of steps are represented in FIG. 2 by a process loop in the flow diagram in which an index (i) is incremented each pass through the loop. As will become clear, however, the hardware implementation shown in FIG. 1 does not actually involve the use of an index and loop processing.

At the beginning of the block of data elements to be permuted, time slot counter 12 is reset (either by receiving a next hop clock pulse after counting to the maximum value or by receiving a hop clock pulse while the hop reset signal is set), so that bits $T_0$ through $T_5$ are all zeros (FIG. 2, step 100). Permutation logic unit 14 respectively receives time count bits $T_0$ through $T_5$ on six signal lines. A five-bit address is formed from bits $T_5$, $T_4$, $T_3$, $T_2$ and $T_1$ (omitting bit $T_0$). The five bit address is used to address Random Code Memory "0". A random bit $R_0$ is retrieved from the memory location in Random Code Memory "0" specified by the five bit address. An exclusive-OR operation is then performed between time count bit $T_0$ and random bit $R_0$ to obtain the output hop code bit $H_0$. In other words, if random bit $R_0$ is zero, then $H_0$ is equal to $T_0$. On the other hand, if random bit $R_0$ is one, then $H_0$ is the opposite of $T_0$. After this first step, the partially converted code is: $T_5$, $T_4$, $T_3$, $T_2$, $T_1$, $H_0$.

Next, a five-bit address is formed from bits $H_0$, $T_5$, $T_4$, $T_3$, $T_2$ (omitting bit $T_1$). The five bit address is used to address Random Code Memory "1". A random bit $R_1$ is retrieved from the memory location in Random Code Memory "1" specified by the five bit address. An exclusive-OR operation is then performed between time count bit $T_1$ and random bit $R_1$ to obtain the output hop code bit $H_1$. After this step, the partially converted code is: $T_5$, $T_4$, $T_3$, $T_2$, $H_1$, $H_0$.

Another five-bit address is then formed from bits $H_1$, $H_0$, $T_5$, $T_4$, $T_3$ (omitting bit $T_2$). The five bit address is used to address Random Code Memory "2". A random bit $R_2$ is retrieved from the memory location in Random Code Memory "2" specified by the five bit address. An exclusive-OR operation is then performed between time count bit $T_2$ and random bit $R_2$ to obtain the output hop code bit $H_2$. After this step, the partially converted code is: $T_5$, $T_4$, $T_3$, $H_2$, $H_1$, $H_0$.

Using bits $H_2$, $H_1$, $H_0$, $T_5$, $T_4$ (omitting bit $T_3$), a five-bit address is formed to address Random Code Memory "3". A random bit $R_3$ is retrieved from the memory location in Random Code Memory "3" specified by the five bit address. An exclusive-OR operation is performed between time count bit $T_3$ and random bit $R_3$ to obtain the output hop code bit $H_3$. After this step, the partially converted code is: $T_5$, $T_4$, $H_3$, $H_2$, $H_1$, $H_0$.

Next, using bits $H_3$, $H_2$, $H_1$, $H_0$, $T_5$ (omitting bit $T_4$), a five-bit address is formed to address Random Code Memory "4". A random bit $R_4$ is retrieved from the memory location in Random Code Memory "4" specified by the five bit address. An exclusive-OR operation is performed between time count bit $T_4$ and random bit $R_4$ to obtain the output hop code bit $H_4$. After this step, the partially converted code is: $T_5$, $H_4$, $H_3$, $H_2$, $H_1$, $H_0$.

Finally, using bits $H_4$, $H_3$, $H_2$, $H_1$, $H_0$ (omitting bit $T_5$), a five-bit address is formed to address Random Code Memory "5". A random bit $R_5$ is retrieved from the memory location in Random Code Memory "5" specified by the five bit address. An exclusive-OR operation is performed between time count bit $T_5$ and random bit $R_5$ to obtain the output hop code bit $H_5$'. After this step, the converted code is: $H_5$, $H_4$, $H_3$, $H_2$, $H_1$, $H_0$, which is the output hop code. Thus, the bits of the output hop code are determined in a cascaded manner from least-significant to most-significant, all within one hop clock pulse, wherein less-significant bits that have been determined are used in determining more-significant bits of the hop code.

A more general way to describe the address generation for each random code memory is that the current code (e.g., $T_5$, $T_4$, $T_3$, $T_2$, $T_1$, $H_0$) is rotated so that the bit to be omitted and replaced (e.g., $T_0$) is in the most-significant position ($T_1$, $H_0$, $T_5'$, $T_4$, $T_3$, $T_2$), and then the most-significant bit is omitted to obtain the address. Stated differently, random bit (i) is retrieved from random code memory (i) using an (N−1)-bit address comprising hop code bits $H_{N-1}$, . . . , $H_0$ whose indices are less than (i) followed by time count bits $T_{N-1}$, . . . , $T_0$ whose indices are greater than (i). Equivalently, the address used to index random code memory (i) is:

$H_{i-1}$, . . . , $H_{i-N+1}$, $T_{i+N-1}$, . . . $T_{i+1}$ where the indices for the hop code bits H are non-negative, and the indices for the time count bits T are less than N.

Referring again to FIG. 2, the aforementioned steps for forming the hop code can be represented in a functional flow diagram via a repeating loop, wherein hop code bit $H_i$ is determined on the ith pass through the loop. Specifically, in step 110, random bit $R_i$ is retrieved from random code memory i using the five-bit address hop code bits $H_{N-1}$ . . . , $H_0$ whose indices are less than i and time counts bits $T_{N-1}$, . . . , $T_0$ whose indices are greater than i. The hop code bit $H_i$ is then determined in step 120 as the result of an exclusive-OR of time count bit $T_i$ and the retrieved random bit $R_i$. The loop is repeated until all of the hop code bits have been determined.

At the falling edge of the hop clock pulse, the hop code bits are clocked into hop code register 18, which serves as an output register, and are available as a six-bit output hop code (step 130). This completes the process of permuting one of the data elements in the input block to the first position of the output block. At the rising edge of the next hop clock pulse (step 140), time slot counter 12 increments the time count (step 150), and permutation logic unit 14 determines the data element in the second position of the output block from the new time count. The process continues until time slot counter 12 increments the time count through all of the $2^N$ data elements in the input block.

Once output data elements have been generated from all of the data elements in the input block, these output data elements form an output block of the same data elements, but in a permuted order. Importantly, the same random data must be used throughout processing of the entire block of data elements in order to generate a permutation of the input data elements. In general, a particular set of random bits in random code memories 16 will produce a particular permutation. Altering the value of any random bit in any of the random code memories will cause a different permutation to be generated. Consequently, if values of random bits are changed before completing permutation of an input block of data elements, in general, the output block of data elements will not be a true permutation of the input block. Thus, when a new permutation is to be produced, it is desirable to modify the random data bits between successive blocks of data elements and, at most frequent, the random bits in the random code memories are modified after each repetition of the input block. In particular, the random data should be changed (or the memory location being read by the permutation logic unit should be changed) between the falling edge of the last hop clock pulse of one block of data elements and the rising edge of the first hop clock pulse of the next block of data elements.

In many applications, it may be advantageous to alter the random permutation after each block of data elements in order to make the output sequence of data elements as unpredictable as possible to third parties. However, it is not necessary to modify the permutation after every block of data elements, and certain applications may benefit from altering the random data less frequently. Accordingly, in FIG. 2, the step of modifying the random code memory data (step 160) is shown in dashed lines to indicate that the random data may or may not be changed after completion of each block, depending upon the particular application for which the permutation is used.

Random code data is written into the random code memories using random code logic that orchestrates the writing of random bits into each of the addressable memory locations within the random code memories. In the dual-port memory example shown in FIG. 1, each random code memory 16 receives as inputs: an (N−1)-bit Memory Address, a Memory Select/Write Enable signal; and a Random Bit. The bits of the Memory Select/Write Enable signal represent an integer that identifies one of the random data memories (0 through N−1) and enables data to be written to that random data memory. The memory address identifies a particular memory location within the selected random code memory. The Random Bit is written to the memory location identified by the Memory Address within the random code memory selected by the Memory Select/Write Enable signal. The hop clock and/or information indicating the state of time slot counter 12 can be used in the code replacement logic to coordinate replacement of random data with the timing the blocks of data elements. Of course, any of a number of different code replacement logic schemes can be used to load random bits into the random code memories, depending upon the configuration of the random code memories and the operational requirements of the circuit and the overall system. For example, two sets of memories (or double length memories) can be used, wherein the permutation logic unit reads data from one set (or half memory) while the other set/half is being written to with new random data, with the read/write being periodically alternated between the two sets/halves.

The embodiment shown in FIG. 1 permits a block of $2^N$ multi-bit data elements to be permuted using $N \cdot 2^{N-1}$ random bits (there are N random code memories, each of which stores $2^{N-1}$ random bits). Contrast this result with the aforementioned explicit block permutation, which is capable of permuting only $2^N$ individual bits using this same number of random bits. Since the present invention uses only $N \cdot 2^{N-1}$ random bits to permute a $2^N$-length block of N-bit data elements, only $2^X$ (where $X=N \cdot 2^{N-1}$) different permutations can be generated. Given that a block of $2^N$ data elements can be arranged into $2^N$ ! ($2^N$ factorial) different permutations, the $2^X$ different permutations that the present invention can generate represent only a subset of all possible permutations. Consequently, not all permutations are equally probable; however, the present invention offers a simpler way of achieving uniformity while still providing sufficient randomness in the output. Specifically, it can be shown that the data element in each input position in the input block has an equal probability of being mapped to any position in the output block with equal probability, and the data element occupying each position in the output block has an equal probability of having originated from any position in the input block. Thus, while not uniform in the sense that all possible permutations are equally probable, the set of permutations generated by the present invention is uniform in this relaxed input-output sense, providing acceptable uniformity at a much lower cost in terms of hardware, processing and number of random bits required.

Thus, although the object of the invention is to produce random permutations with uniform probabilities for all possible movements of each position, the invention doesn't produce all permutations that have these properties, but rather, produces permutations of a certain kind that happens to have these properties. More precisely, each implementation of the invention produces a permutation that is controlled by a set of "random" bits. If these "random" bits are perfectly random, that is, are unbiased and independent choices, then the permutations will be uniform in the manner described.

In the hop sequence generator shown in FIG. 1, the output from hop code register 18 is a sequence of randomly permuted blocks of hop codes. Each of these hop codes is assigned to a particular transmission frequency within the operating band of a transmission system. The hop code sequence is generated in the transmitter and used to periodically change the modulation frequency of the transmitted signal. The very same hop code sequence is generated in one or more receivers using the same random code data in order to detect the frequency-hopping signal transmitted by the transmitter.

In the exemplary embodiment shown in FIGS. 1 and 2, each block of data elements must include exactly $2^N$ data elements of N bits each in order for the system to produce a true permutation. Thus, if employed in a frequency-hopping communication system, there would need to be exactly $2^N$ available frequencies in the transmission band (i.e., 2, 4, 8, 16, 32, 64, . . . ). However, it is conceivable, if not likely, that a particular application for which the permutation device is used will require permutation of a number of data elements other than $2^N$. For example, a frequency-hopping communication system may have thirty-one frequency-hopping channels. Thus, if the block includes a number of data elements other than $2^N$, additional processing must be performed to generate a permutation of the input data elements.

Figure 3:
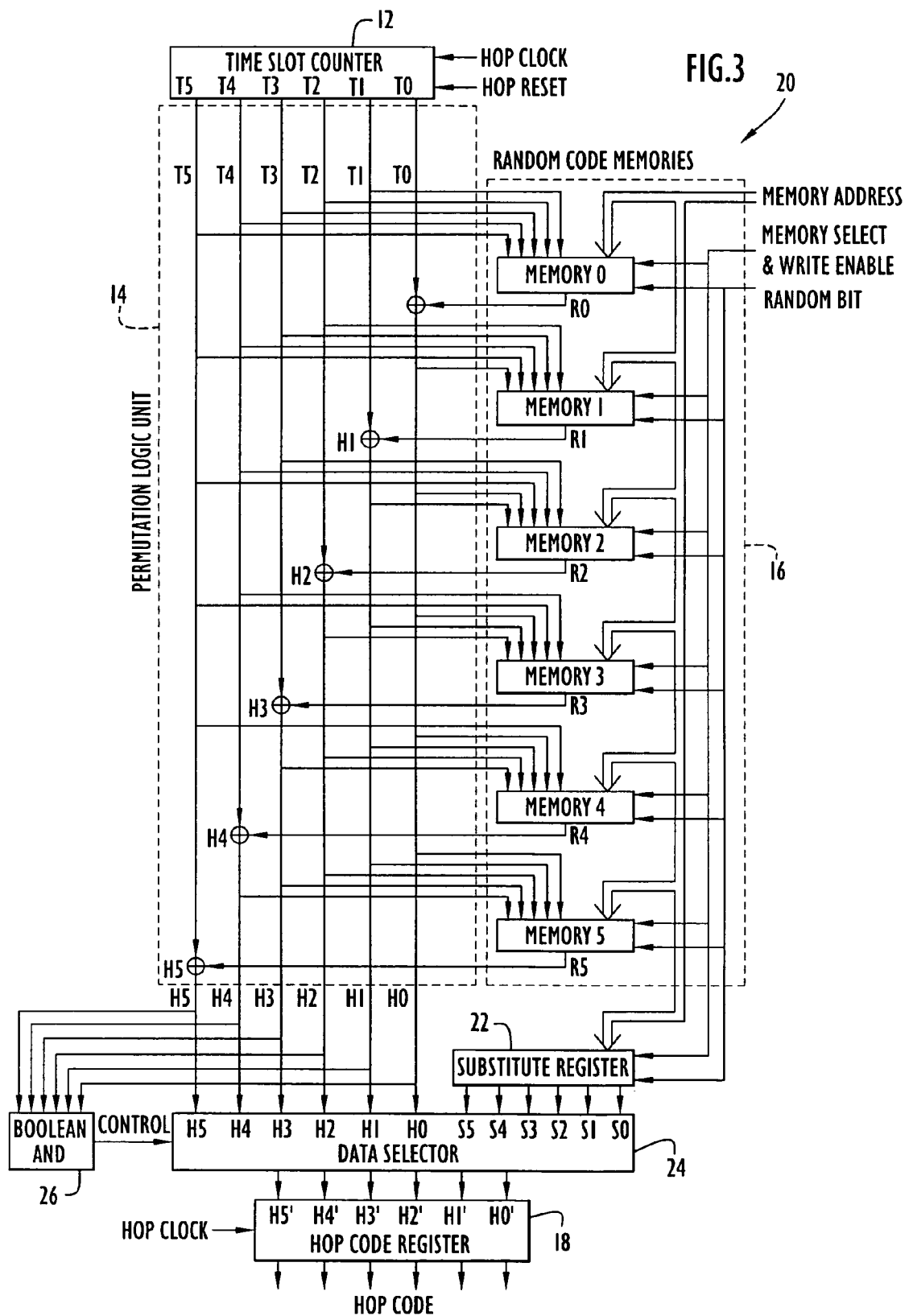
FIG. 3 is schematic diagram illustrating a modified hop sequence generator for generating a sequence of randomly permuted data elements in accordance with another embodiment of the present invention.

The hop code generator circuit of FIG. 1 can be modified to accommodate a system having fewer than $2^N$ hopping frequencies. A circuit 20 that shortens the hop sequence by one frequency (for a total of $2^{N-1}$ frequencies) is shown in FIG. 3. Circuit 20 employs a substitute register 22 that supplies an alternative or "substitute" hop code whenever the hop code generated by permutation logic unit 14 is all ones (i.e., $H_0$, $H_1$, $H_2$, $H_3$, $H_4$, $H_5$=111111), thereby eliminating this particular data element from the output hop sequence. Substitute register 22 is an N-bit register (in this case six bits) that contains a substitute hop code value $S_0$, $S_1$, $S_2$, $S_3$, $S_4$, $S_5$. The bits in substitute register 22 are random bits which can be a subset of the random bits written into the random code memories. For example, as shown in FIG. 1, substitute register 22 can receive the memory address, memory select/write enable and random bit signal received by the random code memories. At the time a random bit is written into memory address 00000 of random code memory "0", the same random bit is written to bit $S_1$ of substitute register 22. Similarly, when a random bit is written into memory address 10000 of random code memory "1", the same random bit is written to bit $S_1$; when a random bit is written into memory address 11000 of random code memory "2", the same random bit is written to bit $S_2$; when a random bit is written into memory address 11100 of random code memory "3", the same random bit is written to bit $S_3$; when a random bit is written into memory address 11110 of random code memory "4", the same random bit is written to bit $S_4$; and when a random bit is written into memory address 11111 of random code memory "5", the same random bit is written to bit $S_5$. If, however, bits $S_0$, $S_1$, $S_2$, $S_3$, and $S_4$ are 11111, a zero is automatically written into $S_5$ to prevent the substitute hop code from being the eliminated data element 111111.

Figure 4:
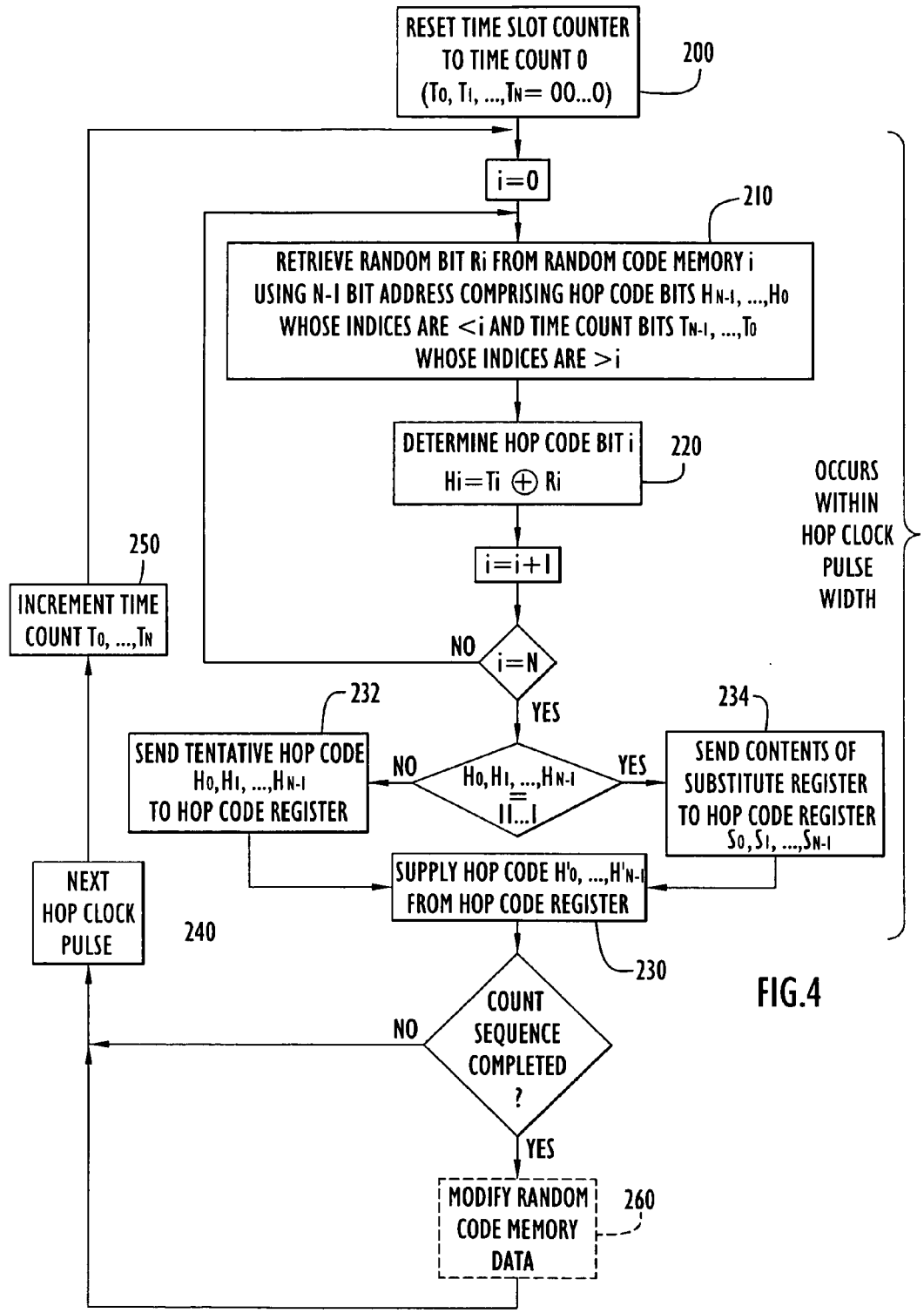
FIG. 4 is a functional flow diagram illustrating operation of the hop sequence generator shown in FIG. 3.
Figure 5:
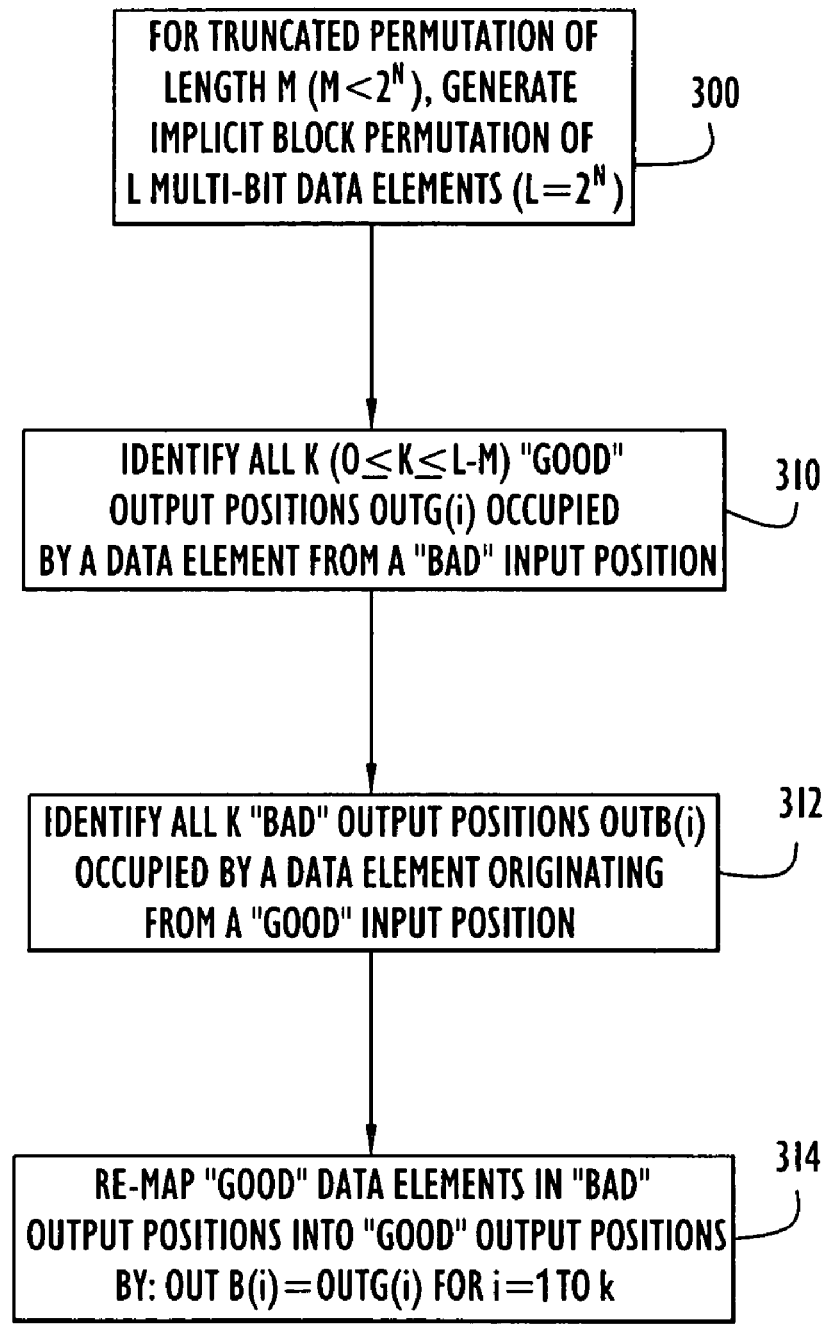
FIG. 5 is a function flow diagram of the steps required to generate a truncated implicit block permutation in accordance with the present invention.

Operation of circuit 20 is described in connection with FIGS. 3 and 4. In FIG. 4, steps 200, 210, 220, 230, 240, 250 and 260 are essentially the same as steps 100, 110, 120, 130, 140, 150 and 160 in FIG. 2, respectively. However, each hop code generated by permutation logic unit 14 is designated as a "tentative" hop code. The tentative hop code and the substitute hop code from substitute register 22 are supplied to a data selector 24, which supplies either the tentative hop code or the substitute hop code to hop code register 18 in accordance with a control signal. Prior to the end of the hop clock pulse in which the tentative hop code is generated, all of tentative hop code bits $H_0$, $H_1$, $H_2$, $H_3$, $H_4$ and $H_5$ are supplied to a boolean AND circuit 24 which in turn supplies the control signal to data selector 24. If the logical AND of all of these bits is one (i.e., if the tentative hop code is 111111), the control signal generated by AND circuit 26 causes data selector 24 to supply the substitute hop code to hop code register 18; otherwise, the control signal causes data selector 24 to supply the tentative hop code to hop code register 18.

Because the substitute hop code is a random six-bit number other than 111111, the resulting hop code sequence will not be a true permutation of the input block of numbers. Further, the circuit modification shown in FIG. 3 reduces the number of data elements only by one. More complex mechanisms would be required to extend this approach to eliminate more than one data element. In accordance with another embodiment of the present invention, a more generalized approach for generating true permutations of any number of data elements is realized. The process involves truncating a permutation of length L ($L=2^N$) to a length M, where M is less than L. In general, a permutation of L data elements must be converted to a smaller permutation of M things without excessive additional processing.

Essentially, L–M position values must be eliminated from the input and output of the permutation. For clarity, the positions within the input (unpermuted) block that are within the range or set of desired values can be called "remaining" or "good" input positions, and the data elements in those input positions can be called "remaining" or "good" data elements. The positions within the input block that are out of the range or set of desired values can be called "eliminated" or "bad" input positions, and the data elements in those positions can be called "eliminated" or "bad" data elements. For example, if there are only five data elements to be permuted (e.g., 0, 1, 2, 3, 4), the basic implicit block permutation must operate on $L=2^N$ data elements, where L is greater than five and N is an integer (i.e., N=3 and L=8). Thus, the first five positions of the input block (containing data elements 0, 1, 2, 3, 4) are the good positions and the last three positions of the input data block (containing data elements 5, 6, 7) are the bad positions. In the output (permuted) block, the positions that are within the range or set of desired values can be called "remaining" or "good" output positions, and the positions within the output block that are out of the range or set of desired values can be called "eliminated" or "bad" output positions. In this example, the first five positions in the output block are the "good" output positions, and the last three positions of the output block are the "bad" output positions.

For mathematical strictness, the result will not be a permutation unless the same values are eliminated at both the input and the output. However, if convenient for a particular application, this restriction can be violated, and the result will be a permutation combined with shifting or renaming of the positions. For example, if the original positions were 0, 1, . . . , 63, the input position 0 and the output position 63 could be eliminated, yielding an input range 1 to 63 and an output range of 0 to 62, with one range shifted with respect to the other.

After it is decided which input and output positions are to be eliminated, the permutation is modified so that it does not use the "bad" positions. If the original permutation moves a data element from a bad input position to a bad output position, this action can simply be ignored, because it will not apply to the truncated permutation. The problem presented is that the basic implicit block permutation process may map data elements in "bad" input positions into "good" output positions and map data elements in "good" input positions to "bad" output positions. Returning to the foregoing example, data element "7", which is in one of the "bad" input positions, may be mapped by the permutation into one of the five "good" output positions. It is easily shown that, even though the number of these moves varies from permutation to permutation, the number of bad-to-good moves is always equal to the number of good-to-bad moves for any specific implicit block permutation to be truncated.

In the case of L−M=1, there is one bad input position InB, and one bad output position OutB. By applying a particular original permutation, the output position P(InB) is determined, where P designates the original permutation, and P(i) is the output position reached from input position i. Next, the truncated permutation is implemented by performing the original permutation and correcting the original permutation whenever it produces the bad output position OutB by substituting the output position P(InB) in this case. The correction or "fix-up" rule is:

If the output position P(i) is OutB (i≠InB), change P(i) to P(InB).

This operation essentially moves the "good" data element that was mapped into the "bad" output position into the "good" output position that would otherwise have been occupied by the "bad" data element originating from the "bad" input position. When P(InB)=OutB, the rule is not needed and is not applied, because the condition of the "if" is not true in this case. In other words, the original permutation happened to map the data element in the "bad" input position into the "bad" output position.

In the case of L−M=2, there are two bad input positions InB1 and InB2, and two bad output positions OutB1 and OutB2. Possible fix-up rules are:

Rules 1a and 1b:
If the output is OutB1, change it to P(InB1).
If the output is OutB2, change it to P(InB2).
Rules 2a and 2b:
If the output is OutB1, change it to P(InB2).
If the output is OutB2, change it to P(InB1).

Rules 1a and 1b do not work if P(InB1)=OutB2 or P(InB2)=OutB1, and Rules 2a and 2b do not work if P(InB1)=OutB1 or P(InB2)=OutB2; however, in any specific case at least one set of rules will work; thus, the rules must be chosen accordingly. In certain cases, only one rule is needed (i.e., when only one of the equalities P(InB1)=OutB2, P(InB2)=OutB1, P(InB1)= OutB1, or P(InB2)=OutB2 is true), and occasionally no rule is needed (i.e., when two of these equalities are true).

As will be understood from the foregoing cases of L−M=1 and L−M=2, realizing the truncated permutation essentially involves identifying when "good" data elements originating from "good" input positions are mapped into "bad" output positions, and remapping these data elements into those "good" output positions into which data elements from "bad" input positions have been mapped. A generalized approach for forming a truncated permutation of M data elements by remapping will now be described in connection with FIG. 5. For a truncated permutation of length M (i.e., containing M data elements), generate an implicit block permutation of length L, where $L=2^N$ and N is the smallest integer that makes L greater than M (step 300). This permutation can be denoted the "original" permutation. For each original permutation, identify and list all "good" output positions OutG(1), OutG(2), . . . , OutG(K) (0<K≦L−M) that are occupied by a data element from a "bad" input position (step 310), and list all "bad" output positions OutB(1), OutB(2), . . . , OutB(K) that are occupied by a data element from a "good" input position (step 312). (There is always an equal number (K) of each, for a given permutation.) Then, re-map the "good" data elements from their "bad" output positions to "good" output positions by the following rules (step 314):

If the output is OutB(1), change it to OutG(1);
If the output is OutB(2), change it to OutG(2);
. . .
If the output is OutB(K), change it to OutG(K).
or simply: OutB(i)=OutG(i), for i=1 to K There may be at most one rule for each bad output, and each rule can be implemented by conditional replacement logic like that in the above-described hop sequence generator. If implemented in hardware, a comparitor is needed to implement each if-condition, a replacement register to hold the OutG value, and a multiplexer to perform the replacement. Alternatively, the OutG values can be listed in a memory in the order that they are found, and then the general rule can be implemented by the rule OutB(i)=OutG(i) for each value of i from 1 to K.

In general, the original permutation needs to be implemented twice: once to set up the rules (fill the replacement memory), and a second time to provide a preliminary permutation that gets corrected by the rules (replacement logic). Using the foregoing methodology, the truncated permutations are not quite as uniform as the original permutations in the sense that mapping from input to output positions may not be equally likely for all positions. However, the slight loss of uniformity is tolerable for most applications. The permutation truncation technique of the present invention allows permutations of any number of data elements (not just block of $2^N$ data elements) to be permuted, thereby greatly enhancing the potential usefulness of the present invention.

While the present invention has been described in the context of generating hop code sequences for a frequency-hopping communication system, the permutation techniques described herein can be employed in a variety of other applications. For example, the ability to control the rate at which the permutation varies (by controlling the timing of replacement of random bits) makes the present invention useful in "code replacement" schemes. Numerous encoding schemes are used to transmit communication signals. In order to successfully receive an encoded signal, a receiver must know the precise signal encoding. Because the encoding varies over time, the receiver often must also know the timing of the received signal within a certain tolerance in order to correctly decode the signal quickly and efficiently. However, because of factors such as clock offsets, unaccounted-for signal path delays and Doppler effects, signals may arrive at a receiver within some span of time uncertainty from an expected time. Under these circumstances, it may be advantageous to have a relatively short signal code that repeats several times within the span of time uncertainty (e.g., a code that is repeated ten times within a span of ±1 second of an expected arrival time), thereby allowing the receiver to treat each repetition of the code alike and enhancing the likelihood of rapid detection or synchronization. This type of repetition can be accomplished using a block permutation, wherein the random bits used to generate the permutation are not varied from block to block, thereby repeatedly generating the same permutation.

The problem with this approach is that the unvarying encoding becomes predictable to third parties. In accordance with the present invention, the random permutation can be gradually modified so that a limited degree of variation occurs within the span of reception time uncertainty but still remains unpredictable to third parties over time. This result can be accomplished by replacing only one random bit per block of data elements. Changing one random bit it the random code memories causes only one change in the resulting permutation (i.e., the positions of two of the data elements in the output block are swapped). Writing only one new random bit after each block will, on average, cause one such change every two blocks (half of the time, the new random bit is the same as the overwritten random bit). Thus, over the span of ten permutation blocks, perhaps five or so changes will be made to the permutation. If the receiver is expecting a particular permutation, a small time offset will result in a small number of these changes, allowing the receiver to detect the signal with only a modest degree of degradation. As the elapsed time from the expect reception time increases, the number permutation changes increases, causing the receiver's ability to detect the signal using the expected coding permutation to fade over time. Thus, if the timing is off by more than a certain window of time, the signal cannot be detected. Consequently, while the receiver has a reasonable window of opportunity to detect the encoded signal, coding information intercepted by a third party becomes obsolete after a short period of time. The code replacement technique of the present invention can be overlaid on virtually any kind of code structure that can vary over time.

In accordance with the present invention, the rate at which the block permutation is varied can be controlled by the frequency and number of random bits replaced. By replacing all random bits after each block, successive permutation are independent of each other. By varying only a subset of the random bits and/or by varying random bits less frequently than every block, some degree of relatedness exists between successive blocks, and the rate at which the permutation varies can be controlled by setting the number and rate of random bits replaced at a particular level.

Although described in the context of permuting multi-bit data elements, the implicit block permutation technique of the present invention can also be used to permute symbols, such as individual bits. In this case, the time slot counter would indicate the timing of bits that are sent (or received), and the resulting "hop code" would be a symbol position indicating the position of symbols before being permuted and sent (or after being received and unpermuted). The symbol position would provide an address to a memory for reading (or writing) the bits or symbols.

Finally, it will be appreciated that the present invention can be applied in contexts other than encoded communication signals. The implicit block permutation technique of the present invention is suitable for automatically generating a random permutation of elements, such as for games of chance that involve repeated selection from a group of elements without replacement (e.g., BINGO, games involving decks of playing cards, selection of lottery numbers, etc.).

Having described preferred embodiments of new and improved method and apparatus for generating random permutations, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of generating a random permutation of a block of data elements, comprising the steps of:
   (a) generating an input block of $2^N$ data elements, wherein each data element occupies a particular position in the input block, each data element being represented by plural symbols; and
   (b) for each data element in the input block, conditionally changing the value of individual symbols of the data element in accordance with random data to form an output data element in a corresponding position in an output block of data elements, the output data element being one of the data elements in the input block, wherein each data element is mapped from a position in the input block to a position in the output block, such that the output block of data elements is a random permutation of the input block of data elements and the input block of data elements is permuted using no more than $N \cdot 2^{N-1}$ random bits.

2. The method of claim 1, wherein, for each symbol of a data element, step (b) includes retrieving a random symbol and determining a value of a corresponding symbol of the output data element as a function of the symbol of the data element and the random symbol.

3. The method of claim 2, wherein the corresponding symbol of the output data element is the exclusive-OR of the symbol of the data element and the random symbol.

4. The method of claim 2, wherein (b) includes retrieving the random symbol using an address comprising symbols from at least one of the data element and the output data element.

5. The method of claim 4, wherein:
   each data element in the input block comprises N symbols $T_0, T_1, \ldots, T_{N-1}$, where N is an integer greater than one, and each output data element in the output data block comprises N symbols $H_0, H_1, \ldots, H_{N-1}$;
   for each data element $T_i$, for i=0 to N−1, step (b) includes retrieving a random symbol $R_i$ using an (N−1)-symbol memory address comprising symbols of the data element whose indices are greater than i and symbols of the output data element whose indices are less than i; and
   determining symbol $H_i$ as the exclusive-OR of $T_i$ and $R_i$, for i=0 to N−1.

6. The method of claim 4, wherein:
   each data element in the input block comprises N symbols $T_0, T_1, \ldots, T_{N-1}$, where N is an integer greater than one, and each output data element in the output data block comprises N symbols $H_0, H_1, \ldots, H_{N-1}$;
   for each data element $T_i$, for i=0 to N−1, step (b) includes retrieving a random symbol $R_i$ using a memory address $H_{i-1}, \ldots, H_{i-N+1}, T_{i+N-1}, \ldots T_{i+1}$ where indices for the output data block symbols H are non-negative and indices for the data element symbols T are less than N; and determining symbol $H_i$ as the exclusive-OR of $T_i$ and $R_i$, for i=0 to N−1.

7. The method of claim 1, further comprising:
(c) altering the random data; and
(d) repeating steps (a) and (b) with the altered random data to produce an output block that is a different random permutation of the input block of data elements.

8. The method of claim 7, wherein the random data is altered after every repetition of steps (a) and (b), such that an order of data element in every output block is independent of the order of data elements in other output blocks, thereby forming an output sequence of data elements comprising varying permutations of the input block of data elements.

9. The method of claim 1, wherein said symbols are binary bits.

10. The method of claim 1, wherein the data elements are numbers and the input block is a sequence of incrementing numbers.

11. The method of claim 1, wherein the data elements correspond to transmission frequencies in a frequency-hopping communication system, and the output sequence is a hop code sequence.

12. The method of claim 1, wherein each data element occurs once in the input block.

13. The method of claim 1, further comprising the step of:
(c) forming a truncated permutation that is a permutation of only a subset of the data elements in the input block.

14. A method of generating a random permutation of a block of data elements, comprising:
(a) generating an input block of data elements wherein each data element occupies a particular position in the input block, each data element being represented by plural symbols;
(b) for each data element in the input block, conditionally changing the value of individual symbols of the data element in accordance with random data to form an output data element in a corresponding position in an output block of data elements, the output data element being one of the data elements in the input block wherein each data element is mapped from a position in the input block to a position in the output block, such that the output block of data elements is a random permutation of the input block of data elements;
(c) altering the random data; and
(d) repeating (a) and (b) with the altered random data to produce an output block that is a different random permutation of the input block of data elements wherein only a subset of the random data is altered, such that ordering of data elements in consecutive output blocks is not independent.

15. The method of claim 14, wherein the random data is altered less frequently than every repetition of steps (a) and (b), such that a same permutation is produced in plural consecutive output blocks.

16. A method of generating a random permutation of a block of data elements, comprising:
(a) generating an input block of data elements, wherein each data element occupies a particular position in the input block, each data element being represented by plural symbols;
(b) for each data element in the input block, conditionally changing the value of individual symbols of the data element in accordance with random data to form an output data element in a corresponding position in an output block of data elements, the output data element being one of the data elements in the input block, wherein each data element is mapped from a position in the input block to a position in the output block, such that the output block of data elements is a random permutation of the input block of data elements; and
(c) determining whether the output data element formed in (b) has a predetermined value and, if so, substituting a data element having a different value for the output data element, such that the output block does not include the output data element having the predetermined value.

17. A method of generating a random permutation of a block of data elements, comprising:
(a) generating an input block of data elements, wherein each data element occupies a particular position in the input block, each data element being represented by plural symbols;
(b) for each data element in the input block, conditionally changing the value of individual symbols of the data element in accordance with random data to form an output data element in a corresponding position in an output block of data elements, the output data element being one of the data elements in the input block, wherein each data element is mapped from a position in the input block to a position in the output block, such that the output block of data elements is a random permutation of the input block of data elements; and
(c) forming a truncated permutation that is a permutation of only a subset of the data elements in the input block, wherein the truncated permutation includes data elements occupying selected positions in the output block, which originated from selected positions in the input block, and excludes data elements occupying excluded positions in the output block, which originated from excluded positions in the input block, wherein step (c) includes:
(c1) after step (b), identifying all selected output positions occupied by a data element from an excluded input position;
(c2) after step (b), identifying all excluded output positions occupied by a data element from a selected input position; and
(c3) remapping the data elements occupying the excluded output positions identified in step (c2) into the selected output positions identified in step (c1).

18. An apparatus for generating a random permutation of a block of data elements, comprising:
an input device configured to supply an input block of data elements, wherein each data element occupies a particular position in the input block, each data element being represented by plural symbols;
a random code memory device for storing random data;
a permutation logic unit responsive to the data elements from said input register to generate output data elements, wherein, for each data element in the input block, said permutation logic unit conditionally changes the value of individual symbols of the data element in accordance with random data retrieved from said random code memory to form an output data element in a corresponding position in an output block of data elements, the output data element being one of the data elements in the input block, wherein each data element is mapped from a position in the input block to a position in the output block, such that the output block of data elements is a random permutation of the input block of data elements;

means for determining whether the output data element formed by said permutation logic unit has a predetermined value; and means for substituting a data element having a different value for the output data element if the output data element has the predetermined value, such that the output block does not include the output data element having the predetermined value.

19. An apparatus for generating a random permutation of a block of data elements, comprising:

an input device configured to supply an input block of $2^N$ data elements, wherein each data element occupies a particular position in the input block, each data element being represented by plural symbols;

a random code memory device for storing random data; and a permutation logic unit responsive to the data elements from said input register to generate output data elements, wherein, for each data element in the input block, said permutation logic unit conditionally changes the value of individual symbols of the data element in accordance with random data retrieved from said random code memory to form an output data element in a corresponding position in an output block of data elements, the output data element being one of the data elements in the input block, wherein each data element is mapped from a position in the input block to a position in the output block, such that the output block of data elements is a random permutation of the input block of data elements and the permutation logic unit permutes the input block of data elements using no more than $N \cdot 2^{N-1}$ random bits.

20. The apparatus of claim 19, further comprising an output register which receives each output data element generated by said permutation logic unit.

21. The apparatus of claim 19, wherein said input device is a counter that periodically supplies an incremented number in response to a periodic signal.

22. The apparatus of claim 19, wherein said random code memory device comprises a plurality of random code memories each storing a plurality of random data bits.

23. The apparatus of claim 19, wherein, for each symbol of a data element, said permutation logic unit retrieves a random symbol from said random code memory device and determines a value of a corresponding symbol of the output data element as a function of the symbol of the data element and the random symbol.

24. The apparatus of claim 23, wherein said permutation logic unit determines the corresponding symbol of the output data element is the exclusive-OR of the symbol of the data element and the random symbol.

25. The apparatus of claim 23, wherein said permutation logic unit retrieves the random symbol from said random code memory device using an address comprising symbols from at least one of the data element and the output data element.

26. The apparatus of claim 25, wherein:

each data element in the input block comprises N symbols $T_0, T_1, \ldots, T_{N-1}$, where N is an integer greater than one, and each output data element in the output data block comprises N symbols $H_0, H_1, \ldots, H_{N-1}$; and for each data element $T_i$, for i=0 to N−1, said permutation logic unit retrieves a random symbol $R_i$ from said random code memory device using an (N−1)-symbol memory address comprising symbols of the data element whose indices are greater than i and symbols of the output data element whose indices are less than i; and determines symbol $H_i$ as the exclusive-OR of $T_i$ and $R_i$, for i=0 to N−1.

27. The apparatus of claim 26, wherein said random code memory device comprises N random code memories respectively corresponding to the N symbols of each data element, wherein random code memory i supplies random symbol $R_i$, for i=0 to N−1.

28. The apparatus of claim 25, wherein:

each data element in the input block comprises N symbols $T_0, T_1, \ldots, T_{N-1}$, where N is an integer greater than one, and each output data element in the output data block comprises N symbols $H_0, H_1, \ldots, H_{N-1}$; and for each data element $T_i$, for i=0 to N−1, said permutation logic unit retrieves a random symbol $R_i$ from said random code memory device using a memory address $H_{i-1}, \ldots H_{i-N+1}, T_{i+N-1}, \ldots, T_{i+1}$ where indices for the output data block symbols H are non-negative and indices for the data element symbols T are less than N; and determines symbol $H_i$ as the exclusive-OR of $T_i$ and $R_i$, for i=0 to N−1.

29. The apparatus of claim 19, wherein said input device repeatedly supplies the input block of data elements to said permutation logic unit;

said random code memory device periodically stores altered random data; and said permutation logic unit repeatedly forms output blocks of data elements from the input blocks of data elements using the altered random data, such that the output blocks of data elements represent different random permutations of the input block of data elements.

30. The apparatus of claim 29, wherein the random data is altered after every repetition of the input block of data elements, such that an order of data elements in every output block is independent of the order of data elements in other output blocks, thereby forming an output sequence of data elements comprising varying permutations of the input block of data elements.

31. The apparatus of claim 19, wherein said symbols are binary bits.

32. The apparatus of claim 19, wherein the data elements are numbers and the input block is a sequence of incrementing numbers.

33. The apparatus of claim 19, wherein the data elements correspond to transmission frequencies in a frequency-hopping communication system, and the output sequence is a hop code sequence.

34. The apparatus of claim 19, wherein each data element occurs once in the input block.

35. The apparatus of claim 19, wherein said permutation logic unit forms a truncated permutation that is a permutation of only a subset of the data elements in the input block.

36. The apparatus of claim 35, wherein:

the truncated permutation includes data elements occupying selected positions in the output block, which originated from selected positions in the input block, and excludes data elements occupying excluded positions in the output block, which originated from excluded positions in the input block; and after initially mapping all of the data element in the input block into the output block, said permutation logic unit identifies all selected output positions occupied by a data element from an excluded input position; identifies all excluded output positions occupied by a data element from a selected input position; and re-maps the data elements occupying the identified excluded output positions into the identified selected output positions.

37. An apparatus for generating a random permutation of a block of data elements, comprising:

an input device configured to supply an input block of data elements, wherein each data element occupies a particular position in the input block, each data element being represented by plural symbols;

a random code memory device for storing random data; and a permutation logic unit responsive to the data elements from said input register to generate output data elements, wherein, for each data element in the input block, said permutation logic unit conditionally changes the value of individual symbols of the data element in accordance with random data retrieved from said random code memory to form an output data element in a corresponding position in an output block of data elements, the output data element being one of the data elements in the input block, wherein each data element is mapped from a position in the input block to a position in the output block, such that the output block of data elements is a random permutation of the input block of data elements, wherein:

the input device repeatedly supplies the input block of data elements to said permutation logic unit;

the random code memory device periodically stores altered random data;

the permutation logic unit repeatedly forms output blocks of data elements from the input blocks of data elements using the altered random data, such that the output blocks of data elements represent different random permutations of the input block of data elements; and only a subset of the random data is altered, such that ordering of data elements in consecutive output blocks is not independent.

38. The apparatus of claim 37, wherein the random data is altered less frequently than every repetition of the input block of data elements, such that a same permutation is produced in plural consecutive output blocks.

* * * * *